United States Patent [19]

Wriede

[11] 4,025,518

[45] May 24, 1977

[54] PROCESS FOR PREPARING QUINACRIDONEQUINONE BY OXIDATION OF DIHYDROQUINACRIDONE

[75] Inventor: Peter Artur Wriede, Wilmington, Del.

[73] Assignee: E. I. Du Pont de Nemours and Company, Wilmington, Del.

[22] Filed: Feb. 20, 1976

[21] Appl. No.: 659,932

[52] U.S. Cl. .................................... 260/279 QA
[51] Int. Cl.² ................................... C09B 48/00
[58] Field of Search ........................ 260/279 QA

[56] References Cited

UNITED STATES PATENTS

| | | | |
|---|---|---|---|
| 3,185,694 | 5/1965 | Jaffe et al. | 260/279 QA |
| 3,251,845 | 5/1966 | Jaffe | 260/279 QA |
| 3,632,588 | 1/1972 | Ehrich | 260/279 QA |

OTHER PUBLICATIONS

Nagai et al., Kogyo Kagaku Zasshi 69(4), 669–674, (1966).

*Primary Examiner*—Donald G. Daus
*Assistant Examiner*—Diana G. Rivers

[57] ABSTRACT

Improved process for preparing quinacridonequinone by the oxidation of dihydroquinacridone in aqueous acidic medium using an alkali metal chlorate as the oxidizing agent in the presence of vanadium pentoxide and, optionally, passing air through the aqueous acidic medium during the oxidation. The quinacridonequinone so prepared exhibits superior color quality and is useful as a pigment in a wide variety of applications.

7 Claims, No Drawings

PROCESS FOR PREPARING QUINACRIDONEQUINONE BY OXIDATION OF DIHYDROQUINACRIDONE

BACKGROUND OF THE INVENTION

This invention relates to an improved process for the preparation of quinacridonequinone and its substituted derivatives.

Quin(2, 3b)acridine-6,7,13,14(5,12H)tetrone, more commonly called quinacridonequinone, is a well known compound which is used in the manufacture of commerical pigments. Quinacridonequinone and its substituted derivatives have been prepared by the condensation of anthranilic acid with benzoquinones under the influence of suitable oxidizing agents, followed by cyclization under the influence of such dehydrating agents as concentrated sulfuric acid, as described, for example, in J. Russ. Phys. Chem. Soc., 47, 1260-8 (1915), CA 9, 3056 (1915), and in U.S. Patent 3,185,694. Quinacridonequinones are commonly prepared commercially by the oxidation of quinacridone with sodium bichromate in acid medium.

A process for preparing quinacridonequinones directly from the corresponding dihydroquinacridones is described in U.S. Pat. No. 3,251,845. This process involves heating the dihydroquinacridone in an acid medium containing an anion from the group consisting of chromate ion, permanganate ion, and nitrate ion, with the provision that the permanganate ion may be used in an alkaline medium. Although the quinacridonequinones produced according to U.S. Pat. No. 3,251,845 are highly satisfactory for many pigmentary applications, the purity and intensity of color are not as high as desirable for especially high quality pigmentary applications. Furthermore, the oxidation reaction produces a relatively large concentration of heavy metal ions which must be removed from the reaction medium prior to disposal to avoid environmental pollution.

This invention provides for an improved process for producing highly pure and color intense quinacridonequinones from dihydroquinacridones without the need for high concentrations of heavy metal oxidants.

SUMMARY OF THE INVENTION

According to the invention, there is provided an improved process for oxidizing a dihydroquinacridone to a quinacridonequinone according to the equation

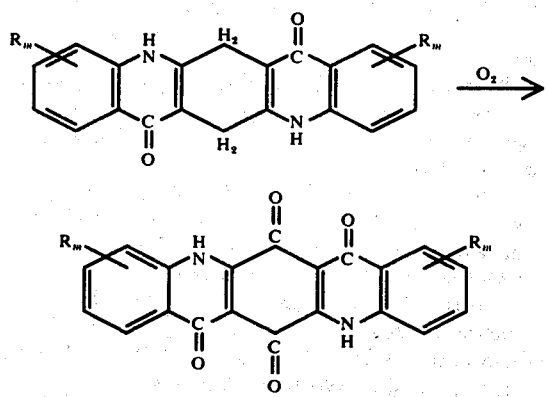

where R is selected from the group consisting of hydrogen, halogen, and lower alkyl and $m$ is an integer from 1 to 2, inclusive, by contacting said dihydroquinacridone with an oxidizing agent in an aqueous acidic medium at an elevated temperature. The improvement resides in utilizing an alkali metal chlorate as the oxidizing agent in the presence of vanadium pentoxide. To minimize the need to remove vanadium from the aqueous acidic medium prior to disposal and for reasons of economy, it is preferred that the vanadium pentoxide be used in catalytic amounts. The total amount of alkali metal chlorate and vanadium pentoxide must be at least stoichiometric with respect to the dihydroquinacridone to produce the corresponding quinacridonequinone. When catalytic amounts of vanadium pentoxide are utilized it is preferred that the amount of alkali metal chlorate utilized be at least 100% in excess of the stoichiometric amount required to react with the dihydroquinacridone to insure complete oxidation.

The preferred temperature at which to conduct the oxidation is from 75° C. to 100° C. The aqueous acidic medium should preferably contain from 50% to 70% by weight of acid, based on the total weight of the aqueous acidic medium.

To insure the removal of any chlorine which may be produced during the oxidation, it is preferred that air, or equivalent carrier gas, be passed through the aqueous acidic medium during the oxidation.

DETAILED DESCRIPTION OF THE INVENTION

The dihydroquinacridones utilized in the process of the invention are well known compounds and can be prepared by any of a variety of methods known in the art. For example, dihydroquinacridones can be prepared according to U.S. Pat. No. 2,821,529 by heating dialkyl ester of a dianilinodihydroterephthalic acid in an inert high-boiling liquid to form the corresponding dihydroquinacridone upon cyclization.

The aqueous acidic medium in which the oxidation is conducted should preferably contain at least 50% by weight of acid, because at lower acid concentrations the removal of chlorine which may be produced during the oxidation is difficult. However, at acid concentrations greater than 70% by weight the chlorate ion may decompose and result in incomplete oxidation. Consequently the preferred concentration range is from 50% to 70% by weight. The main criteria governing the selection of the acid utilized in the aqueous acidic medium are that the dihydroquinacridone be at least moderately, and preferably highly, soluble therein and that the acid not interfere with the oxidation reaction, e.g., that the acid not be oxidized by the alkali metal chlorate and vanadium pentoxide or that the acid not oxidize the dihydroquinacridone. Inorganic acids are preferred and sulfuric acid is especially preferred because of the high solubility of dihydroquinacridone therein.

The temperature at which the oxidation is conducted should be from 75° C. to 100° C. Below 75° C. the oxidation reaction proceeds less favorably resulting in poor quality quinacridonequinone and incomplete oxidation. Above about 100° C. the alkali metal chlorate can decompose and incomplete oxidation results. The best quality quinacridonequinone is produced at a temperature from 80° C. to 90° C.

The alkali metal chlorate preferred from the standpoint of economy and availability is sodium chlorate.

The vanadium pentoxide utilized in the oxidizing agent according to the practice of the invention can be used as the sole oxidizing agent but the high cost of vanadium pentoxide and the associated pollution problem precludes its use in stoichiometric amount. Therefore, the vanadium pentoxide is preferably utilized in catalytic amounts and alkali metal chlorate is used to regenerate the active V(+5) from the reduced V(+4) state. Alakli metal chlorate may oxidize dihydroquinacridone to form a poor quality brownish quinacridonequinone.

Since chlorine gas may be generated in the reduction of sodium chlorate to regenerate the active V(+5) and this chlorine gas may react with the dihydroquinacridone to form quinacridonequinone and chlorinated by-products, it is preferred that air, or other suitable carrier gas, be passed through the aqueous acidic medium during the oxidation reaction to remove the chlorine gas. This practice is referred to as air sparging in the art. Air is the gas preferred for economy and efficiency, but any gas capable of sparging the chlorine gas from the aqueous acidic medium without interfering with the oxidation reaction is suitable. To further insure that possible side reactions with chlorine are minimized, it is preferred that the dihydroquinacridone be first dissolved in acid then slowly added to an acidic solution of vanadium pentoxide simultaneously with the addition of a separate aqueous chlorate solution.

The quinacridonequinone so produced can be isolated in the conventional manner, e.g., filtration, washing and drying and directly incorporated into a coating composition or further treated by such conventional procedures as ball milling, salt milling, etc. For example, quinacridonequinone can be incorporated into a solid solution with quinacridone as taught in U.S. Pat. No. 3,607,336 to form an attractive gold pigment, especially useful in metallic finishes with aluminum.

The following examples are to illustrate the invention.

EXAMPLE 1

One hundred grams of 6,13-dihydroquinacridone are dissolved in 940 grams of 94% sulfuric acid at 25° C. In a separate container 100 grams of sodium chlorate are dissolved in 530 grams of water. These solutions are simultaneously added to a solution of 2.5 grams of vanadium pentoxide in 1460 grams of 60% sulfuric acid at 80° C. to 90° C. The rate of addition is controlled so that these solutions are completely added in three to four hours. The resulting reaction slurry is purged with a sub-surface stream of air at a flow rate of six liters/minute per liter of initial vanadium pentoxide solution. Then the reaction slurry is maintained at 80° C. to 90° C. for 30 minutes. To isolate the product water is added to the reaction slurry to reduce the acid concentration to 30% to 40% by weight after which the reaction slurry is filtered. The product is washed acid free with water and dried to give 109 grams of a bright yellow pigment. The pigment is analyzed and found to contain 95% by weight of quinacridonequinone, 1.5% by weight of 6,13-dihydroquinacridone and 0% by weight of quinacridone.

EXAMPLE 2

The procedure of Example 1 is followed except that 342 grams of water are used to dissolve the sodium chlorate and 1262 grams of 70% sulfuric acid is used to dissolve the vanadium pentoxide. One hundred grams of bright yellow quinacridonequinone are recovered.

EXAMPLE 3

The procedure of Example 1 is followed except that 1.25 grams of vanadium pentoxide are used. One hundred and six grams of bright yellow quinacridonequinone are recovered.

Control

The procedure of Example 1 is followed except no vanadium pentoxide is used and the sodium chlorate is replaced by 155 grams chromium trioxide (CrO₃). One hundred grams of brown pigment are isolated analyzing for 58.3% quinacridonequinone.

What is claimed is:

1. In a process for oxidizing a dihydroquinacridone to a quinacridonequinone according to the equation

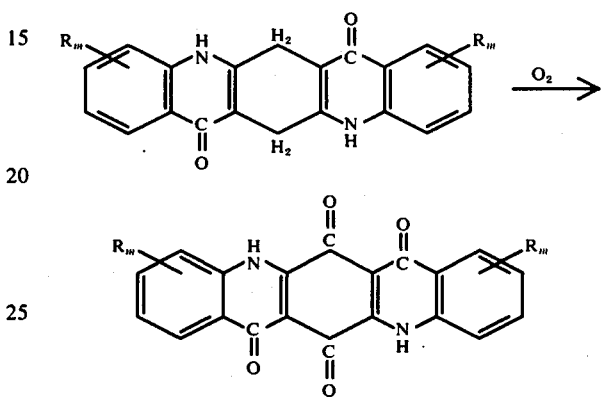

where R is selected from the group consisting of hydrogen, halogen, and lower alkyl and m is an integer from 1 to 2, inclusive, by contacting said dihydroquinacridone with an oxidizing agent in an aqueous acidic medium at an elevated temperature,
the improvement comprising utilizing an alkali metal chlorate as the oxidizing agent in the presence of vanadium pentoxide.

2. Process for oxidizing a dihydroquinacridone to a quinacridonequinone according to claim 1 wherein the total amount of the alkali metal chlorate and vanadium pentoxide is at least stoichiometric with respect to the dihydroquinacridone.

3. Process for oxidizing a dihydroquinacridone to a quinacridonequinone according to claim 2 wherein the aqueous acidic medium contains from 50% to 70% by weight of acid, based on the total weight of the aqueous acidic medium, the dihydroquinacridone being at least moderately soluble in the acid.

4. Process for oxidizing a dihydroquinacridone to a quinacridonequinone according to claim 3 wherein the temperature of the aqueous medium is from 75° C. to 100° C.

5. Process for oxidizing a dihydroquinacridone to a quinacridonequinone according to claim 4 wherein air is passed through the acidic aqueous medium during the oxidation.

6. Process for oxidizing a dihydroquinacridone to a quinacridonequinone according to claim 5 wherein R is hydrogen, m is 1, the alkali metal chlorate is sodium chlorate and the acid is sulfuric acid.

7. Process for oxidizing a dihydroquinacridone to a quinacridonequinone according to claim 6 wherein the dihydroquinacridone is contacted with the oxidizing agent by simultaneously adding a solution of dihydroquinacridone in acid and an aqueous solution of sodium chlorate to a solution of vanadium pentoxide in acid.

* * * * *